Patented Nov. 18, 1924.

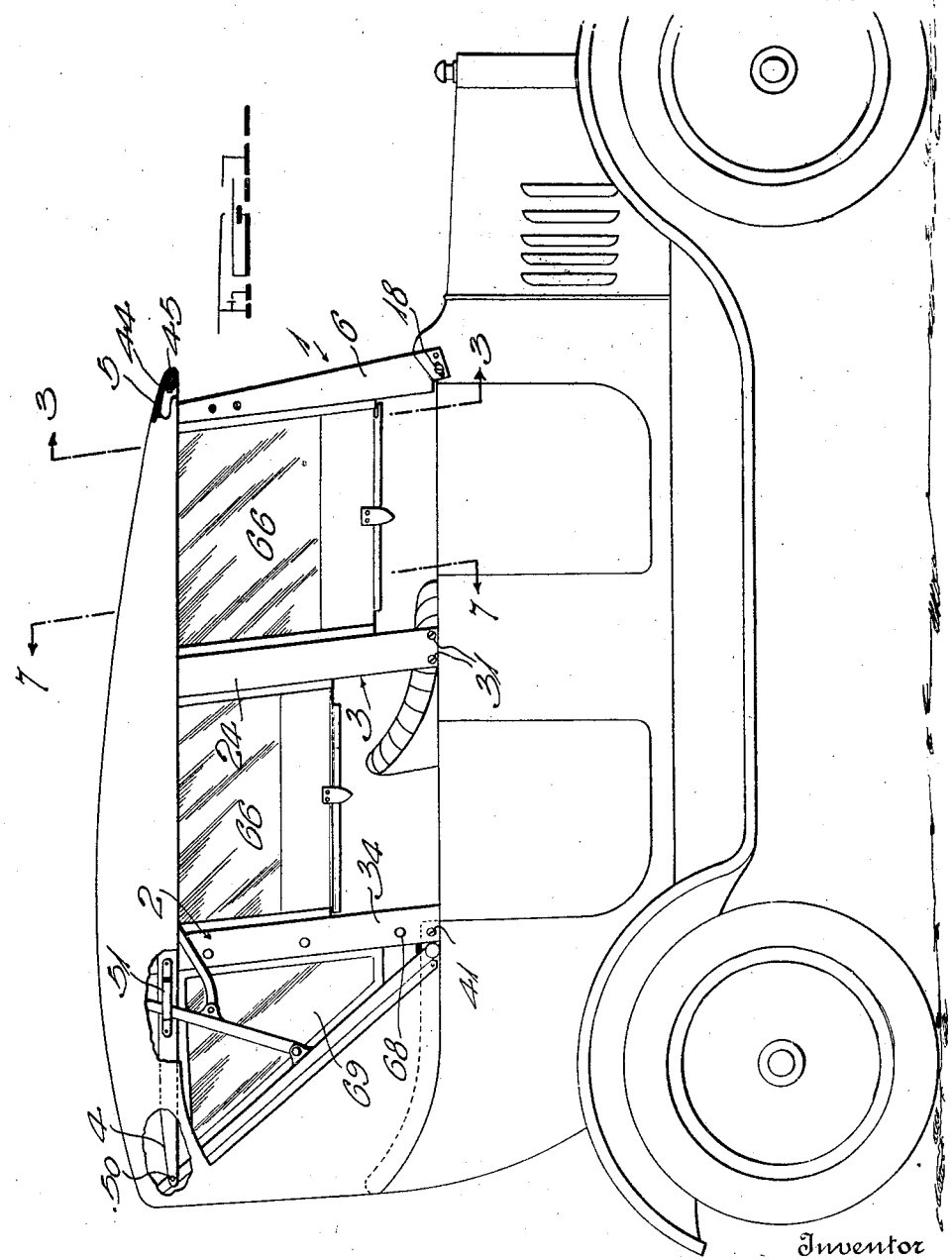

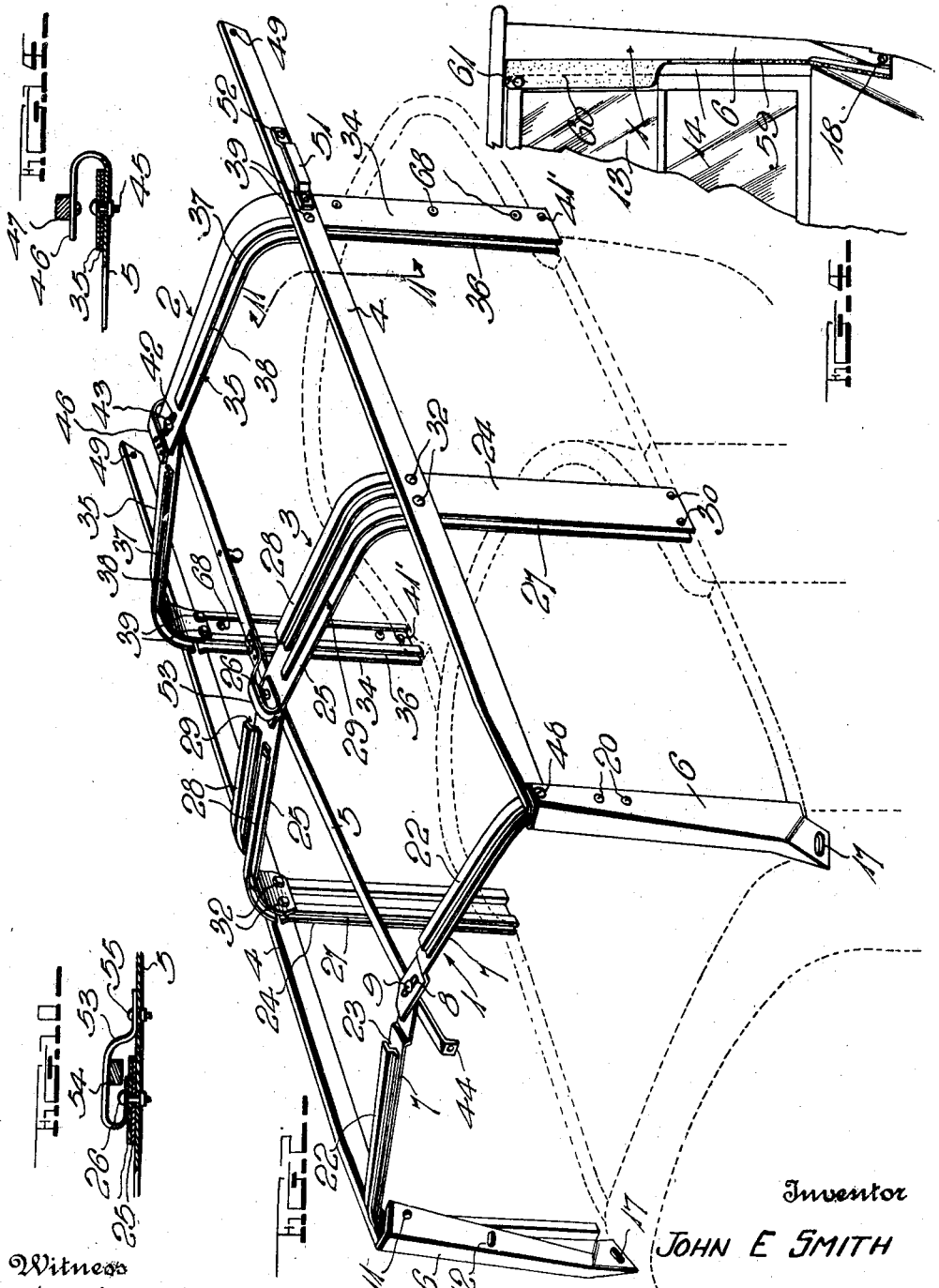

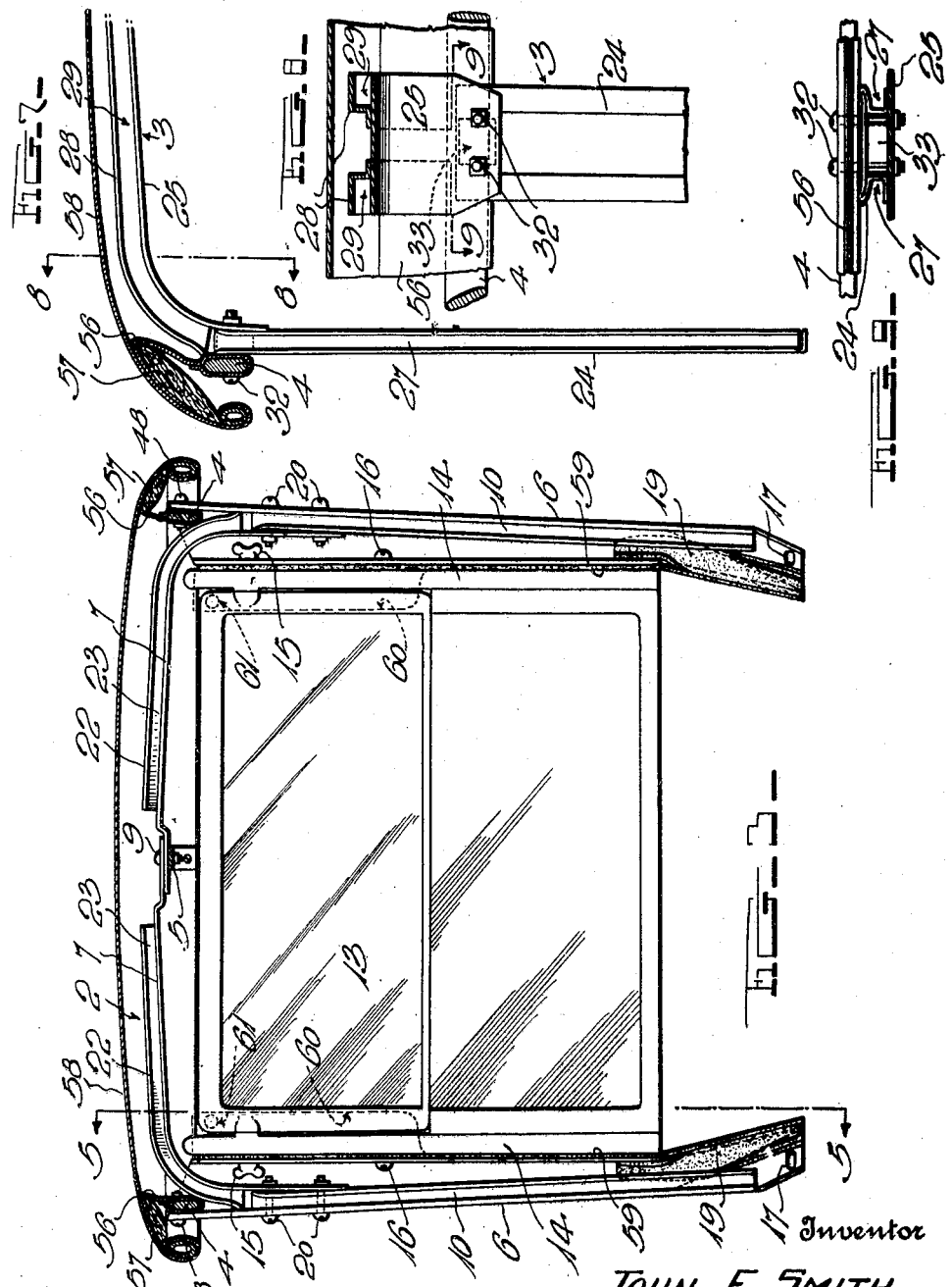

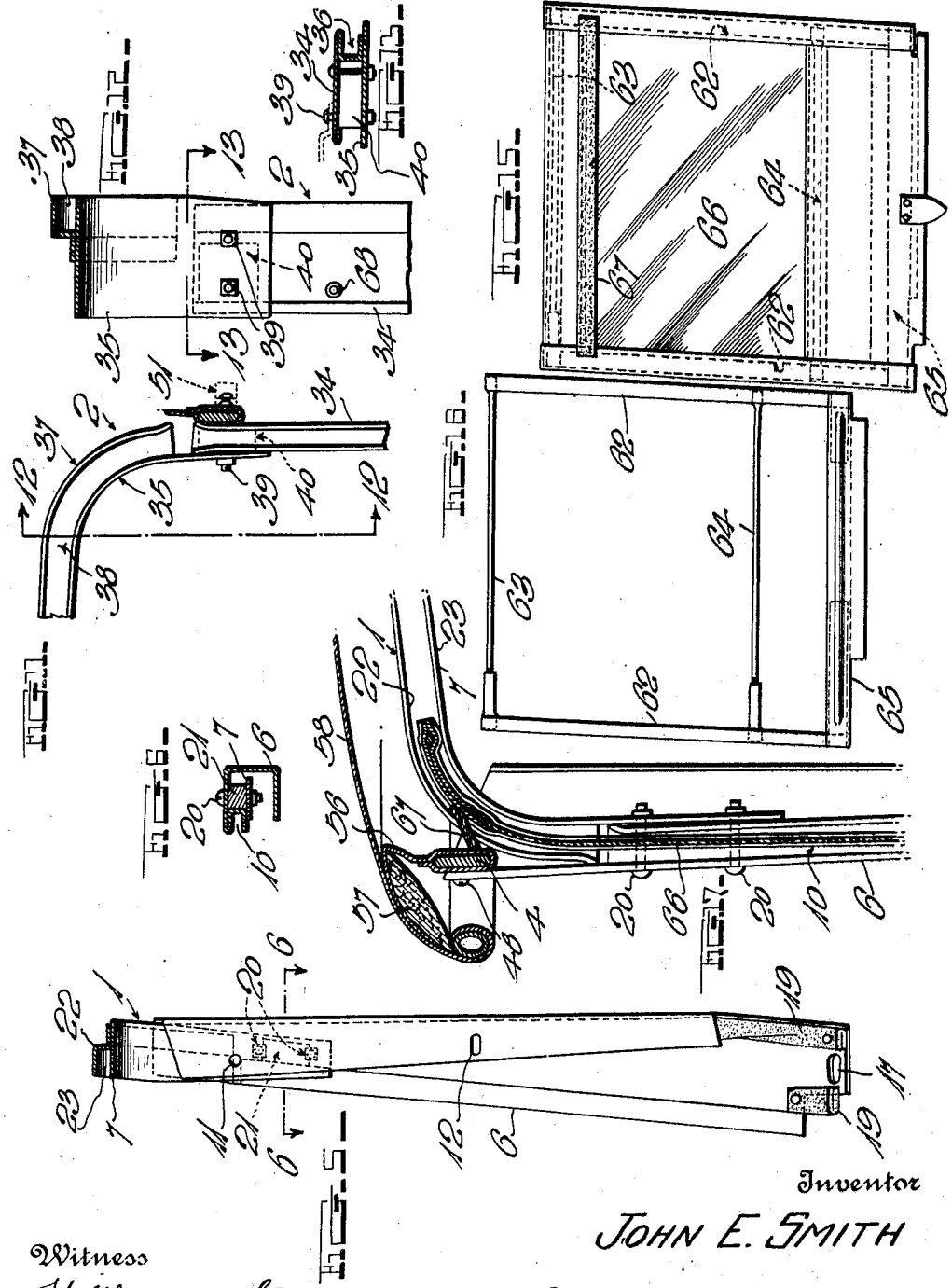

1,516,411

UNITED STATES PATENT OFFICE.

JOHN E. SMITH, OF FOND DU LAC, WISCONSIN, ASSIGNOR TO LONGDIN-BRUGGER COMPANY, OF FOND DU LAC, WISCONSIN, A CORPORATION OF WISCONSIN.

SLIDING-CURTAIN-CARRYING ATTACHMENT FOR AUTOMOBILES.

Application filed March 8, 1923. Serial No. 623,752.

*To all whom it may concern:*

Be it known that I, JOHN E. SMITH, a citizen of the United States, residing at Fond du Lac, in the county of Fond du Lac and State of Wisconsin, have invented certain new and useful Improvements in Sliding-Curtain-Carrying Attachments for Automobiles; and I do declare the following to be a full, clear, and exact description of the invention, such as will enable others skilled in the art to which it appertains to make and use the same.

This invention relates generally to automobile tops, but particularly to sliding curtain carrying attachments for automobile tops. By this, it is meant that the invention is a device which may be applied as an attachment to existing automobile tops. The attachment consists of an arched frame having guideways in which flexible curtains are slidably mounted. These curtains, when in their lowermost positions, with the frame upon which they are mounted and with the existing automobile top, form a completely closed and practically air-tight body for the automobile. The curtains may be easily raised in order to instantaneously transform the closed body of the automobile into an open body, for when the curtains are in raised positions they are disposed directly under and close to the top of the automobile, out of view from the outside of the automobile.

The invention has been designed as an improvement upon the device disclosed in the James H. Boggess Patent 1,456,669, granted May 29, 1923. The device disclosed by the present application has many improved features over the device disclosed by said application, Serial No. 298,172, the principal improvements being that the frame of the attachment is constructed adjustably so that it may be easily attached to an existing automobile top and also that the attachment is provided with certain elements which make the body of the automobile practically air-tight when the sliding curtains are in their lowermost positions.

The novelty in the invention resides in the various features of construction and the combination and arrangement of parts, which are hereinafter fully described and claimed, and shown in the accompanying drawings.

In the drawings:—

Figure 1 is a side elevation of a commonly called touring car type of automobile equipped with a sliding curtain carrying attachment constructed in accordance with the present invention.

Figure 2 is a perspective view of the frame of the attachment, assembled apart from the top of the automobile to show the arrangement of the parts, the flexible flaps which are carried by the side rails of the attachment being omitted so that the other parts may be clearly seen.

Figure 3 is a transverse sectional view of the forward portion of the automobile top and attachment, the section being taken at a point between the windshield of the automobile and the driver's seat substantially upon the line 3—3 of Fig. 1 and looking forwardly toward the windshield.

Figure 4 is a front elevation of a portion of the windshield of the automobile, illustrating particularly the means which has been provided for preventing air from passing between the side edge of the adjustable panel of the windshield and the windshield support.

Figure 5 is an elevational view of the inner side of one of the upright members of the forward bow of the attachment, showing one extremity of the horizontal member of the bow attached thereto and partly in section, the parts of the attachment being shown in this view as they would appear upon a section taken substantially on the line 5—5 of Fig. 3, but with the windshield of the automobile removed.

Figure 6 is a horizontal sectional view of one of the upright members of the forward bow of the attachment, said view being taken substantially on the plane indicated by the line 6—6 of Fig. 5.

Figure 7 is a transverse sectional view across a portion of the automobile top and attachment, taken substantially on the plane indicated by the line 7—7 of Fig. 1, and illustrating particularly portions of the intermediate bow of the attachment and the manner in which a practically air-tight joint is formed between the automobile top and the upper portion of one side of the attachment.

Figure 8 is a longitudinal sectional view of a portion of the attachment taken substantially on the plane indicated by the line 8—8 of Fig. 7, illustrating particularly certain details of construction of the intermediate bow of the attachment, Figure 9 is a horizontal sectional view across one of the upright members of the intermediate bow of the attachment, taken substantially on the plane indicated by the line 9—9 of Fig. 8.

Figure 10 is a detail sectional view taken longitudinally of the frame across the horizontal portion of the intermediate bow of the attachment at a point midway of the ends of this portion of the bow, and illustrating particularly the means which has been provided for securing the attachment at this point to the automobile top.

Figure 11 is a transverse sectional view of a portion of the rear end of the attachment, said view being taken substantially on the plane indicated by the line 11—11 of Fig. 2 and illustrating particularly certain details of construction of a portion of the rear bow of the attachment.

Figure 12 is a longitudinal sectional view of a portion of the rear end of the attachment, taken substantially on the plane indicated by the line 12—12 of Fig. 11 and illustrating particularly certain details of construction of the rear bow of the attachment.

Figure 13 is a horizontal sectional view of one of the upright portions of the rear bow of the attachment, said view being taken substantially on the plane indicated by the line 13—13 of Fig. 12.

Figure 14 is a detail sectional view taken longitudinally of the attachment across the intermediate portion of the horizontal member of the rear bow and illustrating particularly the means which has been provided for securing the rear bow to the top of the automobile.

Figure 15 is a front view of one of the slidable curtains of the attachment.

Figure 16 is a front view of the flexible metal framework of one of the curtains.

Figure 17 is a view similar to the left hand portion of Fig. 3 but on a larger scale, illustrating a curtain in its lowermost position and the means carried by the curtain for preventing access of air to the inside of the body of the automobile around the upper edge of the curtain.

The improved device is in the form of an arched frame which is adapted to fit under the usual top of an automobile and which is provided with means for securing it to the top and portions of the sides of the automobile. This frame includes what may be termed a front bow 1, a rear bow 2 and an intermediate bow 3. All of the bows are provided with upright portions for disposition at the sides of the automobile and substantially horizontal portions for disposition beneath the top of the autmobile and close to the top. The bows 1, 2 and 3 are connected together at the upper ends of their upright portions with horizontal rails 4. These rails 4 are adapted to extend longitudinally of the automobile along the sides of the top thereof. The horizontal portions of the bows 1, 2, and 3 are connected together by a strut 5. This is adapted to be disposed directly under the top of the automobile and extends longitudinally of the top substantially midway between the side edges thereof.

The front bow 1 is composed of four sections, namely, a pair of upright sections 6 which constitute the upright portions of the bow, and a pair of sections 7 which constitute the substantially horizontal portion of the bow. The outer ends of the sections 7 are detachably secured to the upper ends of the sections 6. The inner ends of the sections 7 are disposed in overlapping relation and are provided with elongated slots 8. A securing element 9 extends through the slots 8 and through an aperture in the strut 5 to secure the overlapping ends of the sections 7 to the strut 5.

The upright sections 6 of the front bow 1 are made from metal plates which are bent into substantially U-shape in cross section. The upright edge portions of the outer sides of the sections 6 are folded upon themselves and then bent into substantially U-shape to form channels 10. These channels 10 serve as guideways for flexible curtains which will be hereinafter described.

The sections 6 are adapted to be fastened to the standards or posts of the windshield of the automobile and to the sides of the automobile, and therefore their inner sides are provided with apertures 11 and elongated slots 12. The apertures 11 are disposed at the upper ends of the inner sides of the sections 6 in positions to receive the screws which constitute part of the pivots upon which the adjustable panel 13 of the windshield is mounted and which extends outwardly from the windshield standards or posts 14. Ordinarily the projecting ends of the screws just mentioned are provided with thumb nuts 15. These thumb nuts 15 have to be removed when the sections 6 are being applied so that the screws may be extended through the apertures 11. After that has been done, the thumb nuts 15 may be replaced and used to clamp the upper ends of the sections 6 to the windshield posts 14.

The elongated slots 12 are disposed below the apertures 11 and are adapted to receive screws 16 which extend outwardly from the windshield posts 14.

The outer sides of the sections 6 at their lower ends are provided with elongated slots 17. These portions of the sections 6 are adapted to fit upon or bear against the sides and a portion of the cowl of the automobile, and screws or bolts 18 are passed through the slots 17 to secure the lower ends of the sections 6 to the sides of the body of the automobile.

The angles at which the windshields of automobiles are adjusted vary and the sections 6 may be adjusted upon the windshield posts 14 regardless of the angle of the windshield by reason of the elongated slots 12 and 17.

In order to prevent the sides of the automobile from being scratched by the application of the sections 6 thereto, the inner surfaces of the outer sides of the sections 6 are provided with strips 19 of felt or other suitable padding. These strips 19 are secured to the sections 6 in such a place that they will be disposed between said sections and the sides of the automobile body when the sections 6 are applied thereto.

The outer ends of the sections 7 of the substantially horizontal portion of the bow 1 are curved downwardly and are arranged in overlapping relation with the upper ends of the sections 6 and are secured to the upper ends of the sections 6 by means of suitable securing elements 20. As shown in Fig. 6, the securing elements 20 pass through the outer sides of the sections 6 at points adjacent the channels 10, so in order to prevent the channels 10 from being closed or mashed in case the securing elements 20 are tightened too much, wooden spacing blocks 21 are disposed between the outer ends of the sections 7 and the inner surfaces of the outer sides of the sections 6.

Welded or otherwise secured to the upper surfaces of the sections 7 are strips of angle metal 22. These strips 22 form channels 23 upon the sections 7. The outer ends of the channels 23 are in alinement with the upper ends of the channels 10 arranged upon the sections 6. The channels 23 are used as guideways for flexible curtains, and these guideways constitute extensions for the guideways formed by the channels 10.

The intermediate bow 3 is also composed of four sections, namely, a pair of uprights or side sections 24 which constitute the upright portions of the bow, and a pair of horizontal sections 25 which constitute the substantially horizontal portion of the bow. The outer ends of the sections 25 are arranged in overlapping relation with the upper ends of the sections 24 and are secured thereto, and the inner ends of the sections 25 are arranged in overlapping relation and secured to the strut 5 by means of a suitable securing element 26.

The upright sections 24 are made from metal plates, the upright edge portions of which are folded upon themselves and then bent into substantially U-shape as shown in Fig. 9 so as to form a pair of oppositely disposed channels or curtain-receiving guideways 27.

The sections 25 have welded or otherwise suitably secured upon their upper sides angle metal strips 28. These strips 28 form channels or curtain-receiving guideways 29 upon the sections 25, and these guideways 29 are arranged in alinement with the guideways 27 formed in the sections 24.

The lower ends of the sections 24 are provided with apertures 30, through which screws 31 may be passed to secure the lower ends of the sections 24 to the sides of the automobile at points in the region of the front seat thereof. The outer ends of the sections 25 are curved downwardly into overlapping relation with the upper ends of the sections 24 and the sections 25 are secured to the sections 24 by means of bolts or other suitable securing elements 32. These bolts pass in between the channels 27 of the sections 24, so in order to prevent the channels 27 from being mashed or distorted when the bolts 32 are tightened, spacing blocks 33 are interposed between the outer ends of the sections 25 and the upper ends of the sections 24.

The rear bow 2 is also made in four sections, namely, a pair of uprights or side sections 34 which constitute the upright portions of the bow, and a pair of horizontal sections 35 which constitute the substantially horizontal portion of the bow. The upright sections 34 are made from metal plates, the forward upright edge portions of which are folded upon themselves and then bent into substantially U-shape so as to form channels or curtain-receiving guideways 36. Welded or otherwise suitably secured upon the upper sides of the sections 35 are strips 37 of angle metal. These strips form upon the sections 35 channels or guideways 38. The outer ends of the sections 35 are curved downwardly so that the channels 38 are disposed in alinement with the channels 36 formed upon the sections 34.

The downturned outer ends of the sections 35 overlap the upper ends of the sections 34 and are detachably secured thereto by means of bolts or other suitable securing elements 39, spacing blocks 40 being used also in this case to prevent tightening of the bolts 39 from mashing or distorting the channels or guideways 36. The sections 34 are intended to be secured to the sides of the automobile at points opposite the rear seat thereof and beyond the rear doors of the automobile. This is done by means of screws 41 which are driven through apertures 41' disposed in the lower end portions of the sections 34 and driven into the sides of the automobile.

The inner ends of the sections 35 are arranged in overlapping relation and are provided with elongated slots 42. A bolt or other suitable securing element 43 is extended through the slots 42 and through an aperture in the strut 5 so as to secure the overlapping inner ends of the sections 35 to the strut 5.

The strut 5 has its forward end downturned and apertured as shown at 44 in order to receive a screw by which it is secured to the front end portions 45 of the frame of the automobile top. The rear end of the strut 5 is bent upwardly and forwardly as at 46 and this portion 46 is apertured to receive a screw, by which the portion 46 is secured to one of the bows 47 of the automobile top.

The side rails 4 are secured to the rear bow 2 and the intermediate bow 3 by the bolts 39 and 32 respectively. The forward ends of the side rails 4 project beyond the intermediate bow 3 and are secured to the sections 6 of the front bow 1 by means of bolts or other suitable securing elements 48. The rear extremities of the rails 4 extend beyond the rear bow 2 and are provided with apertures 49 adapted to receive bolts 50 or other suitable securing elements to secure them to the rear bow of the automobile top.

One of the intermediate bows of the automobile top is engaged by straps 51 which are carried by the side rails 4. One of the ends of these straps 51 are secured to the side rails 4 by means of one of the bolts 39, while the other ends of the straps 51 are secured to the rails 4 by means of additional bolts 52.

The frame is also fastened to the automobile top by means of a strap 53. One end of this strap 53 is secured to the intermediate bow 3 and strut 5 by means of the bolt 26, while the other end of the strap, after being bent around an intermediate bow 54 of the automobile top, is secured to the strut 5 by means of a bolt 55.

Secured along one of their side edges to the side rails 4 are flexible flaps 56 of cloth or some suitable fabric. As shown in Figs. 3, 7 and 17, the side rails 4 extend along the side edges of the automobile top adjacent the pads 57 which are in the automobile top to make the edges of the same smooth. The flaps 56 have their free edges inserted between the pads 57 and the fabric 58 of the automobile top, so that the space between the upper portion of the frame of the attachment and the automobile top is closed. In this way, air is not permitted to flow freely around the upper portion of the attachment into the body of the automobile.

In order to prevent air from passing between the posts 14 of the windshield and the sections 6 of the front bow 1, strips 59 of felt or other suitable packing material are disposed between the windshield posts 14 and the inner sides of the sections 6. Secured to the front edges of the upper extremities of these strips 59 are flexible flaps 60. These flaps 60 extend at right angles to the strips 59 over the upper extremities of the windshield posts 14 and over the side edge portions of the adjustable panel 13 of the windshield. At their upper innermost corners, the flaps 60 are provided with buttons 61 which may be snapped onto the studs carried at the upper corners of the adjustable panel 13 of the windshield. The flaps 60 arranged in this manner prevent air from passing into the body of the automobile through the spaces which are disposed between the frame of the adjustable panel 13 of the windshield and the windshield posts 14.

The horizontal portion of the front bow 1 is lower than the horizontal portion of the intermediate bow 3 and the horizontal portion of the latter bow is slightly lower than the horizontal portion of the rear bow 2, so that all three bows are disposed close to the top and the usual head room within the body of the automobile is not lessened. The upright portions of the three bows slant slightly rearwardly from their lower to their upper ends. All of this makes it necessary to give the sections out of which the horizontal portions of the bows are made a rearward inclination toward the center of the top.

The flexible curtains which are slidable in the guideways carried by the bows are constructed very much on the order of the curtains disclosed in the hereinbefore described Patent 1,456,669 of James H. Boggess, for the frames of these curtains comprise a pair of parallel side strips 62, connected together at their upper ends by a torsionally adjustable strut 63, at their intermediate portions by a similar strut 64, and at their lower ends by a rigid strut 65. The frame is covered with fabric and provided with a flexible sheet 66 of transparent material.

In raising the curtains in their guideways, it will be seen that one of their edges begins to bend and extend toward the center of the top before their other edges begin to bend, this being due to the fact that the horizontal portions of the guideways are not all disposed in the same horizontal plane. The torsionally adjustable struts 63 and 64 are therefore necessary in order to prevent the curtains from binding at the points where they bend inwardly toward the center of the top.

The curtains 66 are provided at their outer sides at points adjacent their upper edges with outwardly extending flaps 67 of felt or other suitable material. These flaps 67 are arranged so that when the curtains are pulled down to their lowermost positions, they will engage the side rails 4, as shown in Fig. 17, and prevent access of air into the body of the automobile between the upper ends of the curtains and the side rails.

The upright sections 34 of the rear bow 2 are provided with studs 68 which are adapted to receive suitable buttons carried along the forward edges of triangular-shaped curtains 69. These curtains 69 extend across and cover the spaces which are disposed behind the sections 34 and in front of the forwardly extending portions of the top of the automobile.

In order to assemble the device to an automobile provided with an ordinary top, the sections 6 and the strut 5 should first be fastened onto the automobile. The sections 24, 25, 34 and 35 and the rail 4 of each side of the attachment frame should then be assembled and these two portions of the frame should then be inserted in place under the top. After that has been done, the lower ends of the sections 24 and 34 may be secured to the sides of the body of the automobile, the front and rear ends of the rails 4 may be secured in place and the inner ends of the sections 25 and 35 may then be secured to the strut 5. The sections 7 should be secured to the sections 6 and to the strut 5 before the rails 4 are secured to the sections 6. After the frame has been secured in place, the curtains may be slid into the guideways either from the top or the bottom.

By having the inner ends of the sections 7 and 35 adjustably fastened to the strut 5 and by having the sections 6 adjustably fastened to the windshield posts 14 and the sides of the automobile, the frame may be easily adjusted to fit the automobile and to properly arrange the channels so that the curtains will rest flat upon the upper edges of the doors of the automobile when in their lowermost positions.

From the foregoing description, taken in connection with the accompanying drawings, the construction, use and operation of the device will be readily understood. It will be seen that the attachment can be applied to an automobile provided with a top without modifying or injuring the automobile or top. It will make a closed body out of an ordinary touring car body, and by the provision of the flaps 56, 67 and 60, the attachment will provide practically an air tight body.

It is obvious that numerous changes in form, proportion and in the details of construction of some of the parts may be made without departing from the spirit and principle of the invention or sacrificing any of the advantages thereof, and hence it is to be understood that such may be done within the meaning and scope of the appended claims.

What is claimed is:

1. A sliding curtain carrying attachment for automobile tops comprising an arched frame adapted to be attached to the top, said frame including a front bow, a rear bow and an intermediate bow, said bows having substantially horizontal portions adapted to extend transversely across the top, the substantially horizontal portions of said front and rear bows being composed of two sections, guideways carried by said bows, flexible curtains slidable in said guideways, a strut adapted to extend longitudinally along the top between the side thereof, means for securing the substantially horizontal portion of said intermediate bow to said strut, and vertical securing elements for adjustably securing the inner ends of the sections constituting the substantially horizontal portions of said front and rear bows to said strut, whereby the horizontal portions of said front and rear bows may be easily arranged parallel to the horizontal portion of said intermediate bow.

2. A sliding curtain carrying attachment for automobile tops comprising an arched frame adapted to be attached to the top, said frame including a front bow, a rear bow and an intermediate bow, said bows having substantially horizontal portions adapted to extend transversely across the top, said substantially horizontal portions of each of said bows being composed of two sections having their inner ends disposed in super-imposed overlapping relation along the center of the top, guideways carried by said bows, flexible curtains slidably in said guideways, a strut adapted to extend longitudinally along the top between the sides thereof, means for securing the inner ends of the sections which constitute the substantially horizontal portions of said intermediate bow to said strut, and vertical securing elements for adjustably securing the inner ends of the sections which constitute the substantially horizontal portions of said front and rear bows to said strut, whereby the sections which constitute the horizontal portions of said front and rear bows may be easily arranged parallel to the sections which constitute the horizontal portion of said intermediate bow.

3. A sliding curtain carrying attachment for automobile tops comprising an arched frame adapted to be attached to the top, said frame including a front bow, a rear bow and an intermediate bow, said bows having substantially horizontal portions adapted to extend transversely across the top, said substantially horizontal portion of each of said bows being composed of two sections having their inner ends disposed in overlapping relation along the center of the top, guideways carried by said bows, flexible curtains slidable in said guideways, said frame also including a strut adapted to extend longitudinally along the top between the sides thereof, securing elements extending through said strut and the overlapping ends of the sections which constitute the substantially horizontal portions of said bows to secure said sections to said strut, the inner overlapping ends of the sections which constitute the substantially horizontal portions of said front and rear bows being provided with elongated slots through which said securing elements pass, whereby these sections may be adjusted with respect to said strut and with respect to the sections which constitute the horizontal portion of said intermediate bow.

4. In an automobile, the combination with the top and windshield thereof, of an arched frame disposed beneath said top, said frame including bows having upright portions disposed at the sides of the automobile and substantially horizontal portions extending transversely across the top, guideways carried by said bows, flexible curtains slidable in said guideways, the upright portions of the forwardmost bow of said frame being disposed alongside of the supporting posts of said windshield, means for fastening the upper extremities of the upright portions of the forwardmost bow of the frame to the upper extremity of said windshield posts, means for adjustably fastening the intermediate portions and the lower extremities of the upright portions of the forwardmost bow of said frame to the intermediate portions of said windshield posts and the sides of the automobile respectively, whereby the upright portions of the forwardmost bow of said frame may, after the other portions of said frame are secured to the sides of the automobile and the top, be adjusted to proper relation with the upright portions of the other bows of said frame.

In testimony whereof I have hereunto affixed my signature.

JOHN E. SMITH.